United States Patent
Massard et al.

(10) Patent No.: US 8,442,743 B2
(45) Date of Patent: *May 14, 2013

(54) PARALLEL SEQUENTIAL TURBOCHARGER ARCHITECTURE USING ENGINE CYLINDER VARIABLE VALVE LIFT SYSTEM

(75) Inventors: Nicolas Massard, Nancy (FR); Jean-Jacques Laissus, Thaon Les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,226

(22) Filed: Apr. 15, 2012

(65) Prior Publication Data

US 2012/0198822 A1 Aug. 9, 2012

Related U.S. Application Data

(63) Continuation of application No. 13/193,037, filed on Jul. 28, 2011, now Pat. No. 8,160,803, which is a continuation of application No. 12/121,100, filed on May 15, 2008, now Pat. No. 8,000,878.

(51) Int. Cl.
*F02D 45/00* (2006.01)
*F02B 37/12* (2006.01)
*F02F 1/42* (2006.01)

(52) U.S. Cl.
USPC .......................................................... 701/103

(58) Field of Classification Search .......... 701/103–105; 60/612, 601, 602; 123/294–305
See application file for complete search history.

(56) References Cited

U.S. PATENT DOCUMENTS

| 4,406,126 A * | 9/1983 | Yokokura et al. ................ 60/602 |
| 6,957,632 B1 * | 10/2005 | Carlson et al. ............... 123/46 R |
| 8,000,878 B2 * | 8/2011 | Massard et al. ................ 701/103 |
| 8,160,803 B2 * | 4/2012 | Massard et al. ................ 701/103 |

FOREIGN PATENT DOCUMENTS

DE 102007046657 A1 9/2009

* cited by examiner

*Primary Examiner* — Hieu T Vo
(74) *Attorney, Agent, or Firm* — Brian J. Pangrie

(57) ABSTRACT

A system includes: a cylinder head for a multi-cylinder internal combustion engine where the cylinder head includes, per cylinder, a first exhaust valve and a corresponding first exhaust port and a second exhaust valve and a corresponding second exhaust port and where, for simultaneous control of the first exhaust valve and the second exhaust valve of a cylinder, for that cylinder, the cylinder head delivers a quantity of exhaust via the first exhaust port and a different quantity of exhaust via the second exhaust port; a first exhaust turbine in fluid communication with the first exhaust ports of the cylinder head; and a second exhaust turbine in fluid communication with the second exhaust ports of the cylinder head. Various other devices, assemblies, controllers, etc., are also disclosed.

20 Claims, 10 Drawing Sheets

CONVENTIONAL EXHAUST PORTS 210

EXEMPLARY EXHAUST PORTS 220

EXEMPLARY EXHAUST PORTS 230

PARALLEL SEQUENTIAL TURBOCHARGER ARCHITECTURE USING ENGINE CYLINDER VARIABLE VALVE LIFT SYSTEM

RELATED APPLICATIONS

This application is a continuation of U.S. patent application having Ser. No. 13/193,037, filed Jul. 28, 2011 (U.S. Pat. No. 8,160,803, issue date of Apr. 17, 2012), which is a continuation of U.S. patent application having Ser. No. 12/121,100, filed May 15, 2008 (U.S. Pat. No. 8,000,878, issue date of Aug. 16, 2011), the applications having Ser. Nos. 13/193,037 and 12/121,100 are incorporated herein by reference.

BACKGROUND

Existing parallel-sequential turbocharger architectures rely on one or more downstream exhaust valves (i.e., bypass valves) to direct exhaust and selectively operate one or two turbochargers. Systems based on existing architectures lack flexibility and an ability to respond to a variety of operational conditions. Further, such systems can require bypass valves and can introduce exhaust leakage issues. To overcome such issues, various exemplary methods, devices, systems, etc., are described herein that move control upstream, in association with a cylinder head or cylinder heads.

DESCRIPTION OF DRAWINGS

Non-limiting and non-exhaustive examples are described with reference to the following figures.

DETAILED DESCRIPTION

Various exemplary methods described herein can improve performance, emissions, etc., of an internal combustion engine. Such methods may be optionally implemented by a controller. For example, an exemplary controller includes one or more processors, memory and control logic to individually control at least one of two exhaust valves of a cylinder of an internal combustion engine to either provide exhaust from the cylinder to a single exhaust turbine or to provide exhaust from the cylinder to two exhaust turbines where the two exhaust valves are mounted in a cylinder head of the internal combustion engine. Such control logic may call for operation of one exhaust valve to provide exhaust to a single exhaust turbine and call for operation of two exhaust valves to provide exhaust to two exhaust turbines. In various examples, a system includes a small exhaust turbine and a large exhaust turbine.

An exemplary system can include a cylinder head for a multi-cylinder internal combustion engine where the cylinder head includes, per cylinder, a first exhaust valve and a corresponding first exhaust port and a second exhaust valve and a corresponding second exhaust port; a first manifold path to collect exhaust from the first exhaust ports and to direct the collected exhaust to a first exhaust turbine; and a second manifold path to collect exhaust from the second exhaust ports and to direct the collected exhaust to a second exhaust turbine. Such a system may include a manifold unit for defining the first manifold path and the second manifold path; alternatively, a first manifold defines the first manifold path and a second manifold defines the second manifold path. In various systems, one exhaust turbine differs in size from another exhaust turbine.

In a multi-bank system, banks may be defined as a right bank and a left bank (e.g., as in a V8 configuration). Such a system can include a right cylinder head for a right bank of cylinders where the cylinder head includes, per cylinder, two exhaust valves and two corresponding exhaust ports grouped to form two sets of exhaust ports for the right cylinder head; a left cylinder head for a left bank of cylinders where the cylinder head includes, per cylinder, two exhaust valves and two corresponding exhaust ports grouped to form two sets of exhaust ports for the left cylinder head; a first manifold path to direct exhaust from one set of the exhaust ports of the right cylinder head to a first turbocharger; a second manifold path to direct exhaust from one set of exhaust ports of the left cylinder head to a second turbocharger; and third and fourth manifold paths, the third path to direct exhaust from the other set of exhaust ports of the right cylinder head to a third turbocharger and the fourth path to direct exhaust from the other set of exhaust ports of the left cylinder head to the third turbocharger.

Figure 1:
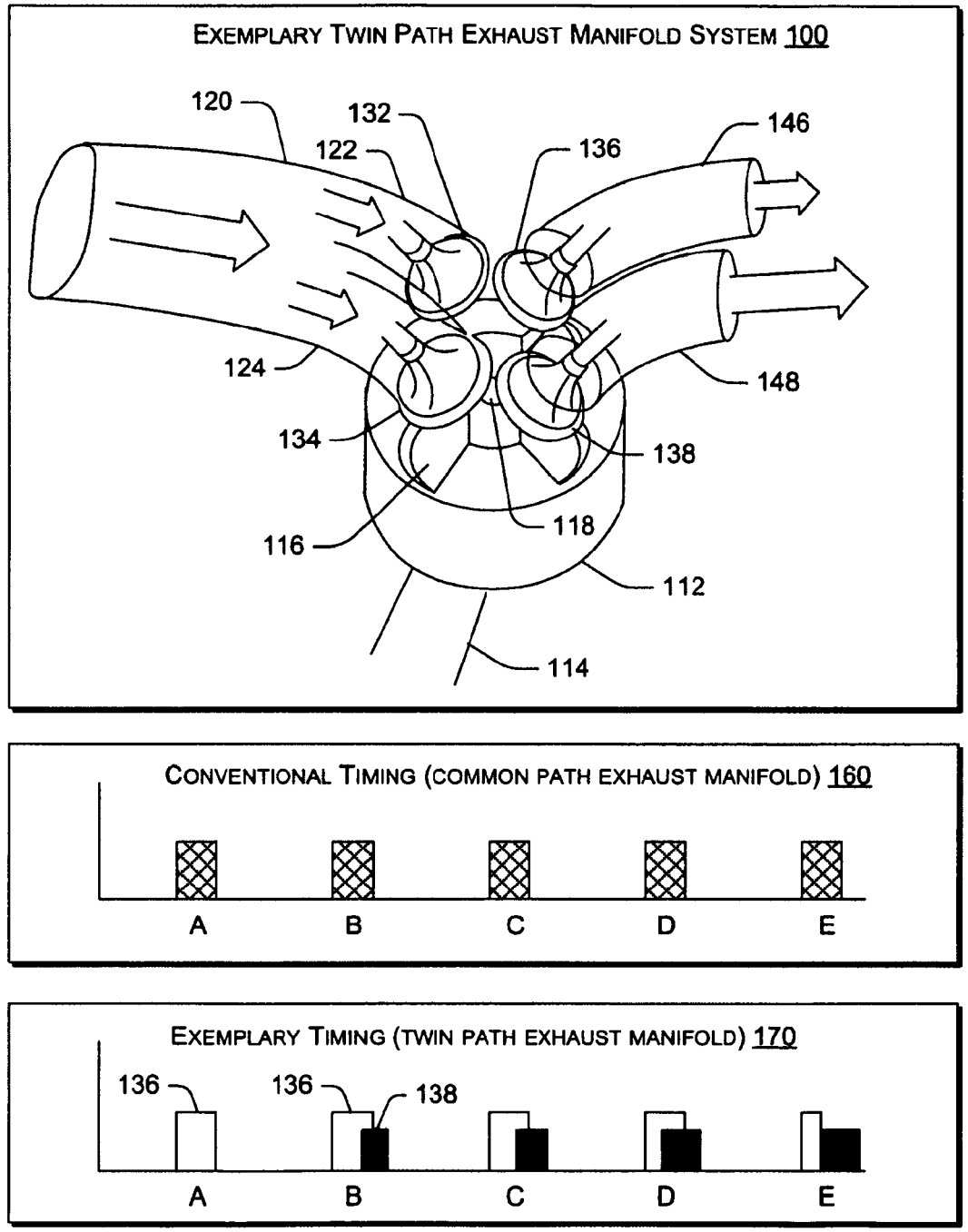
FIG. 1 is a diagram of an exemplary twin path exhaust manifold system for selectively directing exhaust from a cylinder to one or more exhaust turbines.

FIG. 1 shows an exemplary system 100 that includes a twin path exhaust manifold. The system 100 includes a piston 112 connected to a piston shaft 114. The piston 112 includes various head features including wells 116 to accommodate valves and a well to accommodate an ignition plug (e.g., a spark plug). In the example of FIG. 1, a common intake 120 bifurcates to individual intake paths 122, 124 that are controlled by respective intake valves 132, 134. Two exhaust valves 136, 138 control flow of exhaust to respective exhaust paths 146, 148. In the example of FIG. 1, the exhaust paths 146, 148 remain separate where each path can be directed to a respective exhaust turbine.

As described herein, a manifold directs exhaust from a plurality of cylinders to a common path. A manifold includes manifold paths, for example, defined by pipes, a cast unit, etc. Various examples described herein include two sets of manifold paths. For example, referring to the system 100 of FIG. 1, each cylinder may have two exhaust valves where one valve provides exhaust to a path of one set and another exhaust valve provides exhaust to a path of the other set.

As described herein, intake air is provided to a cylinder via one or more plenums. A plenum includes a plurality of paths to direct intake air to a plurality of cylinders. For example, in the example of FIG. 1, common intake 120 for the cylinder is a path of a plenum, that typically bifurcates at a cylinder head to provide intake air to the intake valves 132, 134. In various examples, a system may include multiple plenums, for example, where each plenum provides air to a single intake valve of each cylinder in a cylinder bank (see, e.g., FIG. 8).

As described herein, an exhaust manifold or a plenum may be a configured to attach to a cylinder head or may, alternatively, be part of a cylinder head. For example, a so-called integrated exhaust manifold (IEM) is a cylinder head with a built in manifold. A typically IEM has a single exhaust outlet. An exhaust turbine may connect to an IEM outlet or be positioned at a distance from an IEM via an exhaust pipe that attaches to an IEM outlet.

FIG. 1 also shows a conventional timing plot 160 characteristic of a conventional system with a common path exhaust manifold and an exemplary timing plot 170 characteristic of the exemplary system 100 with the exemplary twin path exhaust manifold. The plots 160, 170 include labels A through E for respective events that occur successively in time.

In the plot 160, an exhaust valve or exhaust valves are opened simultaneously with identical amplitude and duration to provide for flow of exhaust to a common path manifold that collects exhaust from multiple cylinders. Further, even if such a conventional system had more than one exhaust valve, it is standard practice that each valve flows to a path that merges to a common path after some short distance (e.g., within 10 centimeters or about 5 inches). Yet further, in conventional systems with more than one exhaust valve, it is standard practice that each valve is identical and controlled via a common control mechanism.

In the plot 170, the exhaust valves 136, 138 may be controlled individually according to one or more of the following criteria: timing, amplitude and duration. Alternatively, or in addition to such control, the exhaust valves 136, 138 may differ in shape, including size. Hence, even if a controller controlled the valves in a simultaneous manner, each valve would deliver a different amount of exhaust to its respective exhaust path 146, 148.

The events A through E of the plot 170 are for purposes of explaining how the two exhaust valves 136, 138 may be controlled. For event A, only the valve 136 is opened. For event B, the valve 136 is opened before the valve 138 and with greater amplitude and duration. For event C, compared to event B, the valve 138 is opened with greater duration. For event D, compared to event C, the valve 138 is opened earlier and with greater duration. For event E, compared to event D, the valve 136 is opened with a shorter duration. Other examples exist to control or to create exhaust flows for two exhaust paths that differ in some quality where each path can be directed to a respective exhaust turbine.

Figure 2:
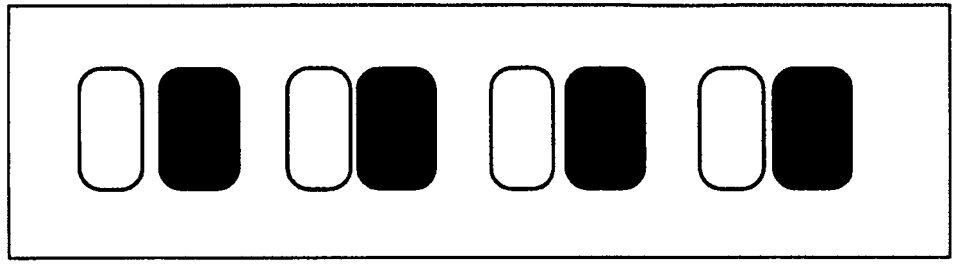
FIG. 2 is a diagram of conventional and exemplary exhaust ports.
Figure 2:
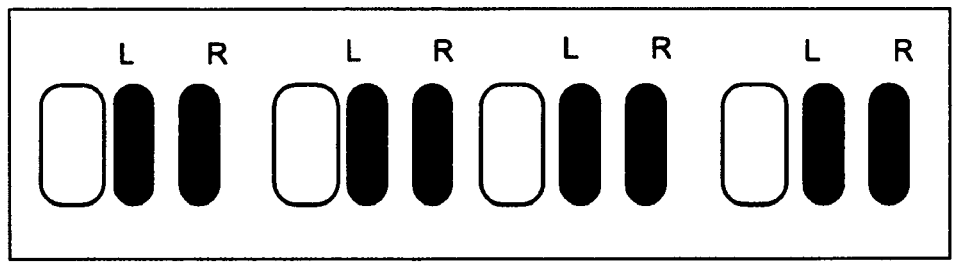
Figure 2:
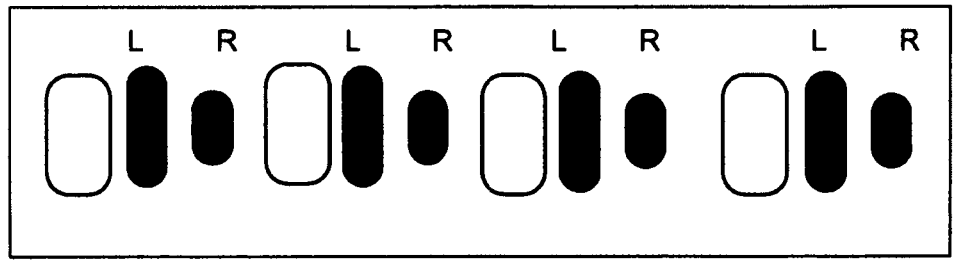

FIG. 2 shows conventional exhaust ports 210 and some exemplary exhaust ports 220, 230. In FIG. 2, exhaust ports are shown schematically as filled portions and optional intake ports as unfilled portions. For example, a 4 cylinder engine may have a cylinder head with exhaust and intake ports on the same side; whereas, for "V" configured engine, exhaust and intake ports may be on opposite side of a cylinder head.

The exhaust ports of FIG. 2 are shown as being associated, for example, with a cylinder head for four cylinders. The conventional ports 210 are of identical shape where there is one exhaust port per cylinder. In such a conventional arrangement, an exhaust manifold collects exhaust from each port and directs the flow of exhaust to a common path. In the exemplary arrangements 220, 230, there are two exhaust ports per cylinder (labeled R and L). As described herein, all of the "R" ports connect to a first common path and all of the "L" ports connect to a second common path where the first common path may be directed to a first exhaust turbine and where the second common path may be directed to a second exhaust turbine. The first common path may be defined by a first manifold and the second common may be defined by a second manifold. In an alternative arrangement, a single manifold defines the first common path and the second common path. For example, a single manifold may be cast with two internal and separate manifolds and connected to a cylinder head; as opposed to two individually cast manifolds where each of these manifolds is connected to the same cylinder head.

Figure 3:
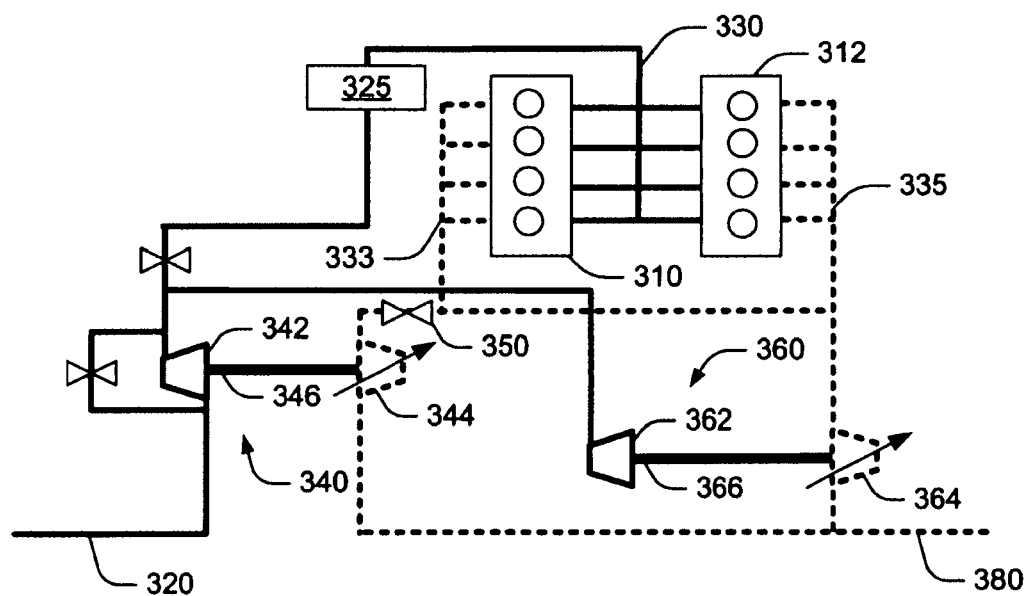
FIG. 3 is a diagram of a conventional twin turbocharger system.

FIG. 3 shows a conventional twin turbocharger system 300. The system 300 includes a first bank of cylinders 310 and a second bank of cylinders 312, for example, arranged in a "V" as in a V8 engine. An intake 320 provides intake air to a plenum 330 that distributes intake air to the cylinders in the banks 310, 312. As explained, each cylinder normally includes at least one intake valve to control the flow of intake air to the cylinder. A cooler 325 may cool intake air.

The system 300 includes a first turbocharger 340 and a second turbocharger 360. The first turbocharger 340 includes a compressor 342 and a turbine 344 coupled to a common shaft 346. The first turbocharger 340 is powered by exhaust flowing from the first bank 310 via an exhaust manifold 333. The second turbocharger 360 includes a compressor 362 and a turbine 364 coupled to a common shaft 366. The second turbocharger 360 is powered by exhaust flowing from the second bank 312 via an exhaust manifold 335.

The turbochargers 340, 360 receive substantially similar exhaust flows when the banks 310 and 312 are operated similarly. To change exhaust flow, the system 300 includes a conduit valve 350 that controls the flow of exhaust in exhaust conduits. For example, when the conduit valve 350 is open, exhaust flows from the manifold 333 to the exhaust turbine 344 of the first turbocharger 340; whereas, when the conduit valve 350 is closed, exhaust from the manifold 333 flows to the exhaust turbine 364 of the second turbocharger 360. The conduit valve 350 may be referred to as a bypass valve as it can cause exhaust to bypass the first turbocharger 340. Exhaust exits the turbines 344, 364 via an exhaust outlet 380 that may provide a path for flow of exhaust to an exhaust treatment unit and then to the atmosphere. In various exemplary systems, the downstream conduit valve 350 may be removed to reduce the number of elements and potential leakage through exhaust system.

Figure 4:
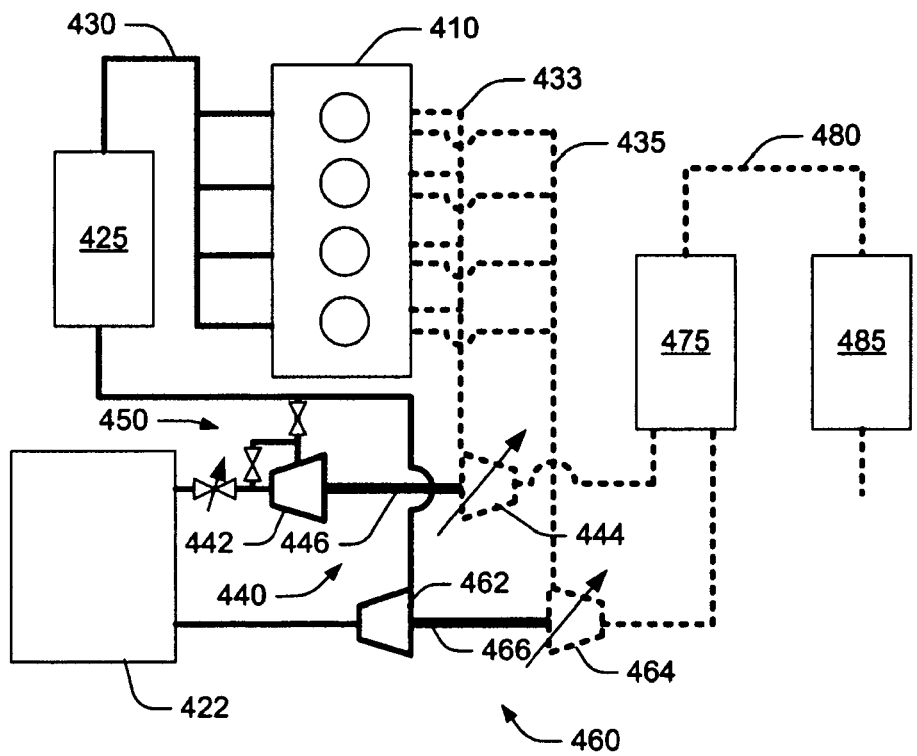
FIG. 4 is a diagram of an exemplary twin turbocharger system.

FIG. 4 shows an exemplary twin turbocharger system 400. In the example of FIG. 4, the system 400 includes a single bank of cylinders 410; noting that other arrangements are possible. An intake filtering unit 422 provides intake air to a plenum 430 that distributes intake air to the cylinders in the bank 410. As explained, each cylinder normally includes at least one intake valve to control the flow of intake air to the cylinder. A cooler 425 may cool intake air.

The system 400 includes a first turbocharger 440 and a second turbocharger 460. The first turbocharger 440 includes a compressor 442 and a turbine 444 coupled to a common shaft 446. The first turbocharger 440 is powered by exhaust flowing from the bank 410 via a first exhaust manifold 433. The second turbocharger 460 includes a compressor 462 and a turbine 464 coupled to a common shaft 466. The second turbocharger 460 is powered by exhaust flowing from the bank 310 via a second exhaust manifold 435. As explained with respect to FIGS. 1 and 2, each cylinder in a bank of cylinders have two or more exhaust valves where the valves control flow of exhaust from the cylinder to more than one exhaust path. Hence, in the example of FIG. 4, the first manifold 433 forms a first exhaust path that may be directed to the exhaust turbine 444 and the second manifold forms a second exhaust path that may be directed to the exhaust turbine 464.

The turbochargers 440, 460 may receive substantially similar exhaust flows or may receive substantially different exhaust flows. For example, as explained with respect to FIG. 1, where each cylinder in the bank 410 includes two exhaust valves that may be controlled differently, then such control may cause the exhaust flow in the manifold 433 to differ from the exhaust flow in the manifold 435. Consequently, the exhaust turbines 444 and 464 may receive different quantities and/or qualities of exhaust from the bank 410. Alternatively, or in addition to, the shape of the first manifold 433 and the second manifold 435 may differ to thereby cause the exhaust flow to the exhaust turbine 444 and the exhaust turbine 464 to differ in quantity and/or quality.

Depending on the arrangement of the manifolds 433 and 435, one manifold may be operates so as to preheat or cause a temperature change in the other manifold. For example, valve control may cause exhaust to flow from the cylinders in the bank 410 to the first manifold 433 for a period of time while such control causes no exhaust to flow to the second manifold 435 for that period of time. When the manifolds 433 and 435 are cast from as a single unit with separate flow paths, exhaust flow along a first manifold path will cause the unit to heat the walls of the second manifold path. Such preheating can ensure that heat is not lost when a control decision is made to direct exhaust to the second manifold path and on to the exhaust turbine 464. Such a method can ensure proper delivery of energy to intake air by the compressor 462.

In the example of FIG. 4, exhaust exits the turbines 444, 464 via an exhaust treatment unit 475. The output of the unit 475 is collected by an exhaust outlet 480 that may provide a path for flow of exhaust to another exhaust treatment unit and/or noise abatement unit 485 and then to the atmosphere. In this example, the quality and/or quantity of exhaust provided to the exhaust treatment unit 475 may be controlled to enhance operation of the unit 475. For example, a controller may cause exhaust valves for the cylinder bank 410 to direct all exhaust to the manifold 433 to ensure proper quantity and quality of exhaust to treat a catalyst in the exhaust treatment unit 475. Such a method may aim to regenerate a catalyst in an exhaust treatment unit to facilitate the catalyst light off.

The example of FIG. 4 may include various features of a conventional 4 cylinder in-line engine. For example, the HONDA® VTEC® (Variable Valve Timing and Lift Electron Control) system is used on 4 cylinder in-line engines and is a valvetrain system developed by Honda Corporation to improve the volumetric efficiency of a four-stroke internal combustion engine. The VTEC® system uses two camshaft profiles and electronically selects between the profiles. In a conventional four-stroke engine, the intake and exhaust valves are actuated by lobes on a camshaft where the shape of the lobes determines the timing, lift and duration of each valve. Timing refers to an angle measurement of when a valve is opened or closed with respect to the piston position (TDC or BDC). Amplitude or "lift" refers to how much the valve is opened. Duration refers to how long the valve is kept open. Due to the behavior of the working fluid (air and fuel mixture) before and after combustion, which have physical limitations on their flow, as well as their interaction with the ignition spark, the optimal valve timing, lift and duration settings under low rpm engine operations are very different from those under high rpm. Optimal low rpm valve timing, lift and duration settings would result in insufficient filling of the cylinder with fuel and air at high rpm, thus greatly limiting engine power output. Conversely, optimal high rpm valve timing, lift and duration settings would result in very rough low rpm operation and difficult idling. The "ideal" conventional engine would have fully variable valve timing, lift and duration, in which the valves would always open at exactly the right point, lift high enough and stay open just the right amount of time for the engine speed in use.

As described herein, an exemplary engine includes two separate exhaust flow paths per cylinder where each path can provide exhaust to a respective exhaust turbine where the exhaust provided by each path may be controlled, for example, by a control scheme (see, e.g., the plot 170 of FIG. 1). For example, at low engine rpm the engine of FIG. 4 can operate using 8 valves (one intake valve and one exhaust valve per cylinder) to selectively operate the turbocharger 460 and, at high rpm the engine of FIG. 4 can operate using 16 valves (two intake valves and two exhaust valves per cylinder) to selectively operate the turbocharger 440 and the turbocharger 460.

Figure 5:
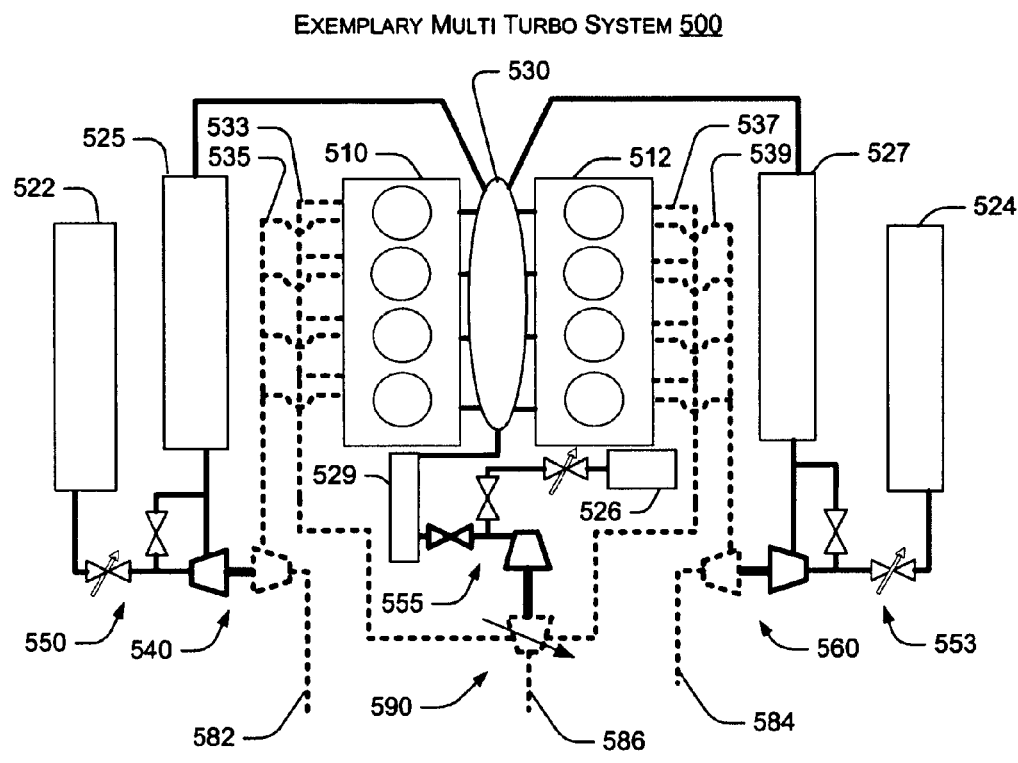
FIG. 5 is a diagram of an exemplary multi-turbocharger system.

FIG. 5 shows an exemplary multi-turbocharger system 500 that includes a first turbocharger 540, a second turbocharger 560 and a third turbocharger 590. The system 500 includes a first bank of cylinders 510 and a second bank of cylinders 512 and an exhaust system that can distribute exhaust from the first bank of cylinders 510 to an exhaust turbine of the first turbocharger 540 and an exhaust turbine of the third turbocharger 590 and that can distribute exhaust from the second bank of cylinders 512 to an exhaust turbine of the second turbocharger 560 and an exhaust turbine of the third turbocharger 590.

In the example of FIG. 5, the system 500 includes three air filtration units 522, 524, 526 and three coolers 525, 527, 529. Conduit valve systems 550, 553, 555 allow for bypassing (or re-circulating) air associated with respective compressors of the first, second and third turbochargers 540, 560, 590. Air is provided to both banks of cylinders 510, 512 via single plenum 530.

In the V8 engine of FIG. 5, with two intake valves and two exhaust valves per cylinder, various operational schemes are possible, including the low/high engine rpm schemes described with respect to FIG. 4.

Figure 6:
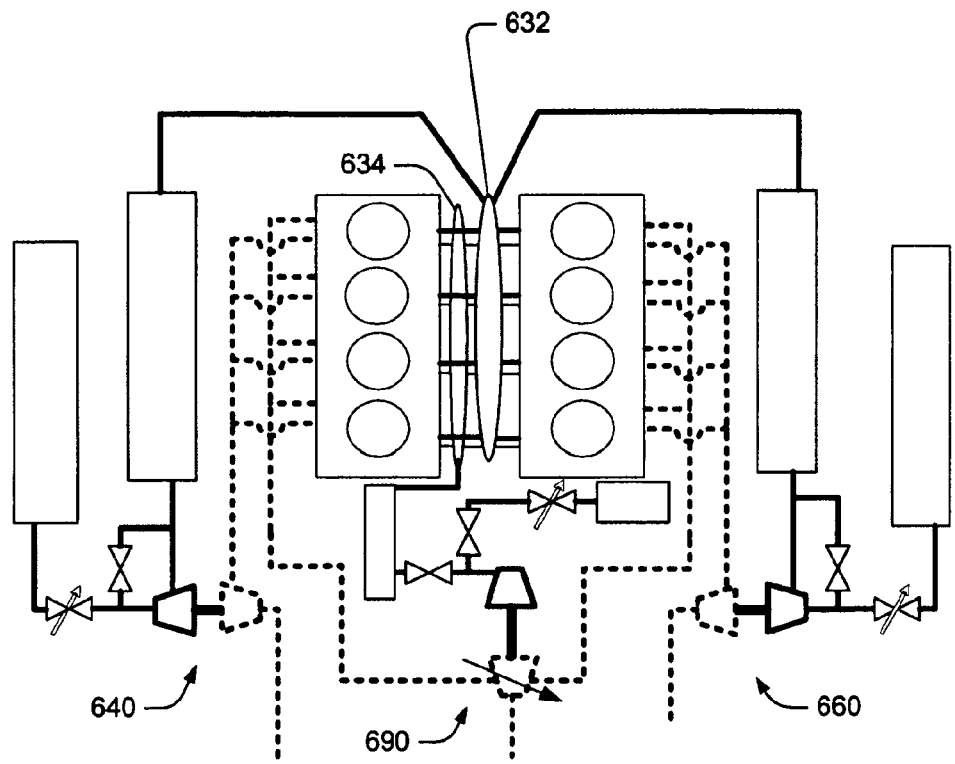
FIG. 6 is a diagram of an exemplary multi-plenum system.

FIG. 6 shows an exemplary multi-plenum system 600 with two plenums 632, 634 where the plenum 632 is associated with turbochargers 640, 660 and the plenum 634 is associated with a turbocharger 690. Other arrangements are also possible. Various other features may be the same as those identified in FIGS. 1, 2, 4 and 5.

With a double plenum architecture, the individual plenums may be controlled individually or in conjunction to achieve a desired result. For example, when only one of the plenums is in operation, then only a single inlet valve per cylinder allows for inflow to each cylinder. In other words, each of the separate plenums 632, 634 feeds a single intake valve per cylinder yet each plenum feeds every cylinder. Hence, to operate the system 100 according to the double plenum system 700, the individual intake paths 122, 124 would not be connected to the common intake 120; instead, for example, the intake path 122 would be connected to the plenum 632 and the intake path 124 would be connected to the plenum 634. Accordingly, the intake valve 132 would operate to provide flow to the cylinder from the plenum 632 and the intake valve 134 would operate to provide flow to the cylinder from the plenum 634.

During low engine rpm operation, a controller may cause only one of the plenums to operate, for example, by controlling the intake valves in a manner where only one intake valve per cylinder is in operation. In this manner of operation, one or both of the turbochargers 640, 660 may provide compressed air to the cylinders via the plenum 632 or, alternatively, the turbocharger 690 may provide compressed air to the cylinders via the plenum 634. During high engine rpm operation, a controller may cause both plenums to operate (e.g., allowing all intake valves to provide intake air to the cylinders).

Figure 7:
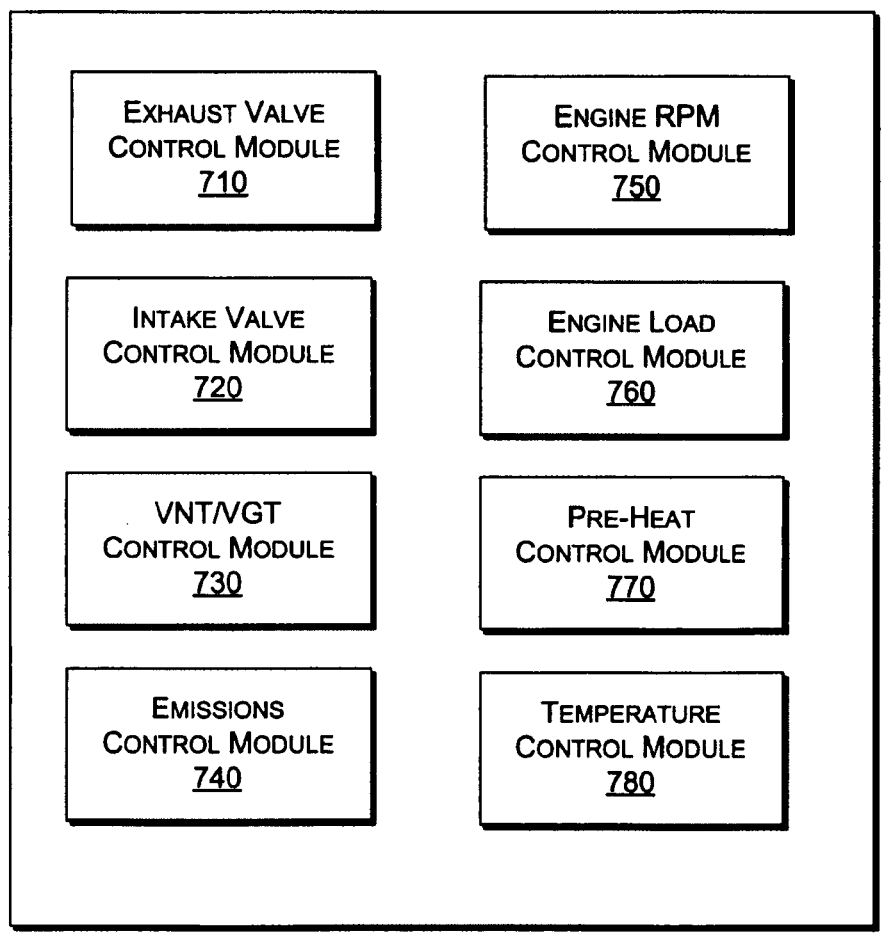
FIG. 7 is a diagram of an exemplary controller for controlling flow of exhaust and optionally other aspects of an internal combustion engine.

FIG. 7 shows an exemplary controller 700 for controlling exhaust valve timing and optionally other features of a turbocharged engine system. For example, the controller 700 may control the exhaust valves 136, 138 of the system 100 of FIG. 1. Such a controller may control timing, amplitude (e.g., lift), duration and optionally other parameters associated with exhaust. With respect to other features, the controller 700 may control any of a variety of combustion-related parameters (e.g., ignition timing, air-fuel ratio, temperature, emissions, etc.). The controller 700 may control one or more aspects of one or more exhaust turbines, or more generally, one or more turbochargers. For example, an exhaust turbine may include variable geometry or "nozzle" features (e.g., VGT, VNT, etc.) that alter the flow of exhaust to an exhaust turbine wheel.

In the example of FIG. 7, the controller 700 includes an exhaust valve control module 710 (e.g., to control flow to one or more exhaust turbines), an intake/plenum valve control module 720, a VNT/VGT control module 730, an emissions control module 740 (e.g., for catalyst conditioning), an engine rpm control module 750 (e.g., to select an exhaust valve control or other control scheme based at least in part on engine rpm), an engine load control module 760 (e.g., to select an exhaust valve control scheme or other control scheme based at least in part on engine load), a pre-heat control module 770 (e.g., to preheat an exhaust path), and a temperature control module 780 (e.g., to control exhaust temperature, engine temperature, etc.).

The controller 700 may include one or more processors, memory and control logic to perform one or more methods. For example, the controller 700 may include control logic to selectively operate one of two exhaust valves to provide exhaust to a single exhaust turbine in a system with multiple exhaust turbines. The controller 700 may include various features typically included in a conventional engine control unit (ECU). For example, the controller 700 can include circuitry, an input for power, one or more inputs to receive commands, engine operational conditions and/or environmental conditions (e.g., outside temperature, humidity, atmospheric pressure, etc.), and one or more outputs to control an exhaust valve or valves, an intake valve or valves, etc. Control logic may be in the form of one or more computer-readable storage media that includes instructions thereon to perform one or more tasks. Hence, the controller 700 may, in some examples, be considered a computer or computing device.

As described herein, a valve controller may rely on one or more of the following: a variable lift system, a camless system, a VTEC system, a hyper-VTEC system or other system that can selectively operate at least one exhaust valve positioned in a cylinder head of an engine.

In various examples with multiple turbochargers, the specifications of the turbochargers may differ. For example, in the system 400 of FIG. 4, the turbocharger 440 may be smaller than the turbocharger 460 and, in the system 500 of FIG. 5, the turbochargers 540, 560 may be smaller than the turbocharger 590. Selective use of smaller turbochargers can reduce manifold volume, which can have a significant positive impact of torque response.

As described herein each cylinder (or piston) can have at least two exhaust valves mounted in the cylinder heads where these valves selectively control the flow of exhaust to exhaust turbines. Such exhaust valves may differ in shape/size depending on matching requirement (e.g., to match flow of exhaust to one or more exhaust turbines).

In various examples, each cylinder includes two exhaust valves (e.g., due to conventional packaging constraints) where each exhaust valve can selectively provide exhaust to at least one exhaust turbine.

As described with respect to FIG. 2, the exhaust port of a cylinder head for a first exhaust turbine may differ from the exhaust port of the cylinder head for a second exhaust turbine. Hence, for example, one exhaust port for a cylinder may have a larger cross-sectional area or a different volumetric shape than another exhaust port for that cylinder.

With respect to manifolds, a manifold may be a "single" manifold with two passages or two distinct manifolds. For example, manifold pipes may be separate or one manifold block may be used and optionally cast as a unit with separate passages. In various examples, when only one exhaust valve per cylinder is functioning, the corresponding exhaust path can warm-up an adjacent, separate exhaust path. A pre-heated exhaust path can increase responsiveness of a turbocharger.

With respect to exhaust gas recirculation (EGR), for a gasoline engine EGR may be use to reduce BSFC. Various systems may be configured to avoid complexity of a so-called long route (low pressure) EGR and operated to improve knock resistance, transient response, etc.

As described herein, various exemplary systems alleviate the need for an external by-pass valve, which, in turn, can simplify piping architecture and minimize system mass. For example, instead of one large turbocharger that runs for high load and/or high engine rpm, an exemplary system includes two or more turbochargers.

As explained, at low load, low engine rpm conditions, a system may operate two smaller turbochargers with a small manifold (e.g., volume basically dived by two versus a standard parallel architecture). Such a volume reduction is good for permeability, transient response and catalyst light off.

As described herein, a small exhaust turbine is easier to spool than a larger exhaust turbine; however, as exhaust flow increases, a small exhaust turbine may not handle the increased exhaust flow as well as a larger exhaust turbine. Accordingly, various exemplary systems and controllers may account for such characteristics and a system may include exhaust turbines of different size. Further, a system may include one or more motorized components such as a motorized compressor or a motorized turbocharger. Yet further, an exhaust turbine may be coupled to a generator to generate electrical energy. Such energy may be used immediately or stored. Uses for electrical energy may include driving a motor coupled to a shaft (e.g., a driveshaft, a compressor wheel shaft, etc.).

As described herein, an exemplary system selectively controls flow of exhaust to two or more exhaust turbines via two exhaust valves positioned in a cylinder head where the cylinder head includes, for each cylinder, an exhaust port for each exhaust valve (i.e., two exhaust ports). Such a system can alleviate the need for "downstream" valves to control flow of exhaust to multiple exhaust turbines.

Figure 8:
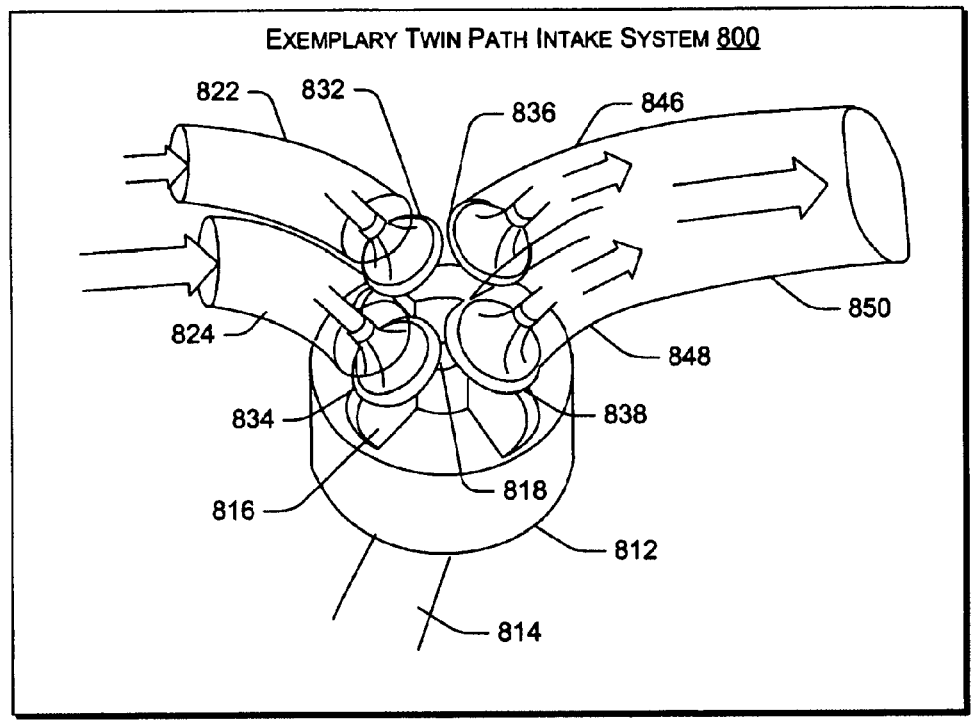
FIG. 8 is a diagram of an exemplary twin path intake manifold system for selectively directing intake air to a cylinder.
Figure 8:
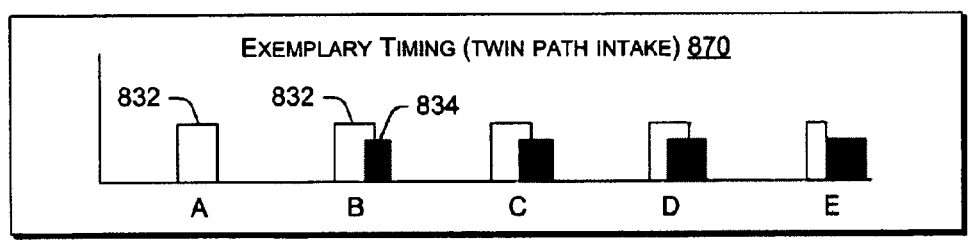

FIG. 8 shows an exemplary system 800 that includes a twin path intake characteristic of a double plenum architecture (see, e.g., plenums 632, 634 of FIG. 6). The system 800 includes a piston 812 connected to a piston shaft 814. The piston 812 includes various head features including wells 816 to accommodate valves and a well to accommodate an ignition plug (e.g., a spark plug). In the example of FIG. 8, two individual intake paths 822, 824 are controlled by respective intake valves 832, 834. Two exhaust valves 836, 838 control flow of exhaust to respective exhaust paths 846, 848, which join a common path 850. The example of FIG. 8 optionally includes an exhaust arrangement as shown in the system 100 of FIG. 1 where separate exhaust paths can be directed to a respective exhaust turbine.

FIG. 8 also shows an exemplary timing plot 870 characteristic of the exemplary system 800 with the exemplary twin path intake. The plot 870 includes labels A through E for respective events that occur successively in time. In the plot 870, the intake valves 832, 834 may be controlled individually according to one or more of the following criteria: timing, amplitude and duration. Alternatively, or in addition to such control, the intake valves 832, 834 may differ in shape, including size. Hence, even if a controller (e.g., the controller 700) controlled the valves in a simultaneous manner, each valve would deliver a different amount of intake air the cylinder.

The events A through E of the plot 870 are for purposes of explaining how the two intake valves 832, 834 may be controlled. For event A, only the valve 832 is opened. Such a scenario can be used to reduce manifold volume, for example, at low engine rpm. For event B, the valve 832 is opened before the valve 834 and with greater amplitude and duration. For event C, compared to event B, the valve 834 is opened with greater duration. For event D, compared to event C, the valve 834 is opened earlier and with greater duration. For event E, compared to event D, the valve 834 is opened with a shorter duration. Other examples exist to control or to create intake flows to a cylinder or cylinders that differ in some quality.

A cylinder head for the system 800 may have any of a variety of port arrangements. For example, for each cylinder, a cylinder head may have two intake ports and two exhaust ports (e.g., one port per valve). Consider the examples of FIG. 2, which show multiple exhaust ports (e.g., labeled left and right for each cylinder). An exemplary cylinder head may have the intake port configured to receive air from two separate intake paths (e.g., two intake plenums). Hence, in the examples of FIG. 2, the intake ports (unfilled) would appear as two separate ports per cylinder instead of a single port per cylinder.

Figure 9:
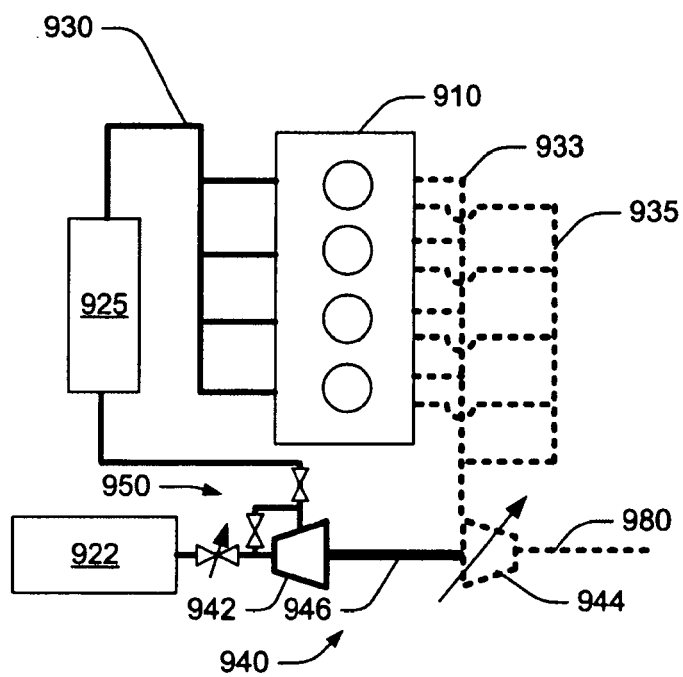
FIG. 9 is a diagram of an exemplary system with twin exhaust paths to a single exhaust turbine.

FIG. 9 shows an exemplary system 900 that includes a bank of cylinders 910 that includes two exhaust valves per cylinder where, for each cylinder, the exhaust valves provide exhaust gas to two separate exhaust manifolds 933, 935, which, in turn, join to provide exhaust to a single exhaust turbine 944 of a turbocharger 940. As explained with respect to the system 100 of FIG. 1, the two exhaust valves of each cylinder of the bank of cylinders 910 may be optionally controlled independently. In such a manner, exhaust may be provided to the exhaust turbine 944 by one valve per cylinder or two valves per cylinder.

The system 900 also includes an intake filtering unit 922 that provides intake air to an intake plenum path 930 that distributes intake air to the cylinders in the bank 910. One or more valves 950 allow for use of or bypass of a compressor 942 of the turbocharger 940. A cooler 925 may cool intake air.

As explained, the turbocharger 940 is powered by exhaust flowing from the bank 910 via one or both exhaust manifolds 933, 935; exhaust exits the exhaust turbine 944 via path 980, which may continue to an exhaust treatment unit. A controller such as the controller 700 of FIG. 7 may be configured to control the system 900 of FIG. 9.

Figure 10:
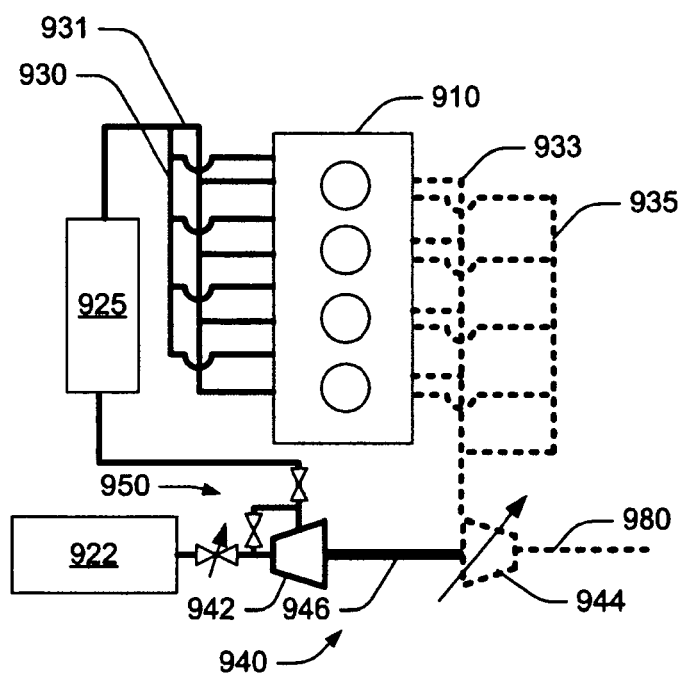
FIG. 10 is a diagram of an exemplary system with twin intake paths and twin exhaust paths to a single exhaust turbine.

FIG. 10 shows a system 902 that includes the features of the system 900 and additionally twin plenums 930, 931. In the example of FIG. 10, the compressor 942 can provide compressed air to the plenum path 930 and/or the plenum path 931. As mentioned, flow of compressed air to the cylinders of the bank 910 can be controlled via the intake valve system 800 of FIG. 8. A controller such as the controller 700 of FIG. 7 may be configured to control the system 902 of FIG. 10. The system 902 may be operated to reduce manifold volume at low engine rpm.

As described herein, an exemplary controller can include one or more processors, memory and control logic to individually control at least one of two intake valves of a cylinder of an internal combustion engine to provide intake air from one or two plenums to the cylinder where the two intake valves are mounted in a cylinder head of the internal combustion engine and where the control logic reduces plenum volume at low engine rpm by calling for operation of only one of the intake valves as a sole source of intake air to the cylinder. Hence, such control logic can call for operation of one intake valve or the two intake valves based at least in part on engine rpm. Further, such control logic may optionally control at least one of the two intake valves of the cylinder based on performance of an intake air compressor.

An exemplary system includes a cylinder head (for a multi-cylinder internal combustion engine) that includes, per cylinder, a first intake valve and a corresponding first intake port and a second intake valve and a corresponding second intake port; a first manifold path to direct intake air to the first intake ports; a second manifold path to direct intake air to the second intake ports; and a controller to individually control, per cylinder, at least the first intake valve or at least the second intake valve. Such a system can include a single turbocharger configured to provide compressed intake air to the first manifold path, the second manifold path or the first manifold path and the second manifold path. In such a system, the first intake port and the second intake port may differ in shape, for example, to handle different intake flows.

The invention claimed is:

1. A system comprising:
   a cylinder head for a multi-cylinder internal combustion engine
   wherein the cylinder head comprises, per cylinder,
   a first exhaust valve and a corresponding first exhaust port and
   a second exhaust valve and a corresponding second exhaust port and
   wherein, for simultaneous control of the first exhaust valve and the second exhaust valve of a cylinder, for that cylinder, the cylinder head delivers a quantity of exhaust via the first exhaust port and a different quantity of exhaust via the second exhaust port;
   a first exhaust turbine in fluid communication with the first exhaust ports of the cylinder head; and
   a second exhaust turbine in fluid communication with the second exhaust ports of the cylinder head.

2. The system of claim 1 wherein the first exhaust ports differ in size, shape, or shape and size from the second exhaust ports.

3. The system of claim 2 wherein the first exhaust ports differ in cross-sectional area from the second exhaust ports.

4. The system of claim 2 wherein the first exhaust ports differ in volumetric shape from the second exhaust ports.

5. The system of claim 1 wherein the first exhaust valves differ in size, shape, or shape and size from the second exhaust valves.

6. The system of claim 5 wherein a difference between the first exhaust valves and the second exhaust valves depends on a matching requirement for matching flow of exhaust to the first exhaust turbine or to the second exhaust turbine.

7. The system of claim 1 wherein the first exhaust turbine differs in size from the second exhaust turbine.

8. The system of claim 1 wherein the cylinder head delivers a quantity of exhaust via the first exhaust ports to the first exhaust turbine and a lesser quantity of exhaust via the second exhaust ports to the second exhaust turbine and wherein size of the first exhaust turbine exceeds size of the second exhaust turbine.

9. The system of claim 1 further comprising a first manifold that defines passages to communicate exhaust from the first exhaust ports to the first exhaust turbine and a second manifold that defines passages to communicate exhaust from the second exhaust ports to the second exhaust turbine.

10. The system of claim 9 wherein the passages of the first manifold differ in size, shape, or shape and size from the passages of the second manifold.

11. The system of claim 9 wherein the passages of the first manifold differ in volume from the passages of the second manifold.

12. The system of claim 1 further comprising a single cast manifold that defines a set of passages to communicate exhaust from the first exhaust valves and another set of passages to communicate exhaust from the second exhaust valves.

13. The system of claim 12 wherein the two sets of passages differ in volume.

14. The system of claim 1 further comprising a controller to control the first exhaust valves and the second exhaust valves.

15. The system of claim 14 wherein the controller comprises control logic to operate only the first exhaust valves below a low engine rpm limit and to operate the first exhaust valves and the second exhaust valves above the low engine rpm limit.

16. The system of claim 1 further comprising a controller to control a variable geometry mechanism of the first exhaust turbine, the second exhaust turbine, or the first exhaust turbine and the second exhaust turbine.

17. A method comprising:
providing a cylinder head for a multi-cylinder internal combustion engine wherein the cylinder head comprises, per cylinder, a first exhaust valve and a corresponding first exhaust port and a second exhaust valve and a corresponding second exhaust port;
providing a first exhaust turbine in fluid communication with the first exhaust ports of the cylinder head;
providing a second exhaust turbine in fluid communication with the second exhaust ports of the cylinder head; and
simultaneous controlling the first exhaust valve and the second exhaust valve of a cylinder and, for that cylinder, delivering a quantity of exhaust via the first exhaust port for fluid communication to the first exhaust turbine and a different quantity of exhaust via the second exhaust port for fluid communication to the second exhaust turbine.

18. The method of claim 17 wherein the simultaneous controlling comprises opening the first exhaust valve and the second exhaust valve with identical amplitudes and for identical durations.

19. The method of claim 17 wherein the providing a cylinder head comprises providing the first exhaust valve or the first exhaust port with a shape, size or shape and size that differs from the second exhaust valve or the second exhaust port.

20. The method of claim 17 further comprising controlling the first exhaust valve to flow exhaust via the first exhaust port to a first exhaust manifold passage that preheats a second exhaust manifold passage prior to controlling the second exhaust valve to flow exhaust via the second exhaust port to the preheated second exhaust manifold passage wherein the first exhaust manifold passage is in fluid communication with the first exhaust turbine and the second exhaust manifold passage is in fluid communication with the second exhaust turbine.

* * * * *